(12) United States Patent
Watson et al.

(10) Patent No.: US 11,107,004 B2
(45) Date of Patent: Aug. 31, 2021

(54) AUTOMATICALLY REDUCING MACHINE LEARNING MODEL INPUTS

(71) Applicant: Capital One Services, LLC, McLean, VA (US)

(72) Inventors: Mark Louis Watson, Sedona, AZ (US); Austin Grant Walters, Savoy, IL (US); Jeremy Edward Goodsitt, Champaign, IL (US); Anh Truong, Champaign, IL (US); Noriaki Tatsumi, Silver Spring, MD (US); Vincent Pham, Champaign, IL (US); Fardin Abdi Taghi Abad, Champaign, IL (US); Kate Key, Effingham, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/535,789

(22) Filed: Aug. 8, 2019

(65) Prior Publication Data

US 2021/0042656 A1    Feb. 11, 2021

(51) Int. Cl.
*G06N 20/00* (2019.01)
*G06N 3/08* (2006.01)
*G06F 17/18* (2006.01)

(52) U.S. Cl.
CPC ............. *G06N 20/00* (2019.01); *G06F 17/18* (2013.01); *G06N 3/084* (2013.01)

(58) Field of Classification Search
None
See application file for complete search history.

(56) References Cited

U.S. PATENT DOCUMENTS

| 2018/0137406 A1* | 5/2018 | Howard | G06N 3/082 |
| 2020/0193279 A1* | 6/2020 | Hostetler | G06N 20/20 |
| 2020/0293876 A1* | 9/2020 | Phan | H03M 7/702 |

OTHER PUBLICATIONS

Clark et al, Better Hypothesis Testing for Statistical Machine Translation: Controlling for Optimizer Instability (Year: 2011).*
Tsang et al, Detecting Statistical Interactions from Neural Network Weights (Year: 2018).*
Verikas et al, Predictor output sensitivity and feature similarity-based feature selection (Year: 2008).*
Constantinopoulos et al, Bayesian Feature and Model Selection for Gaussian Mixture Models (Year: 2006).*

(Continued)

*Primary Examiner* — Li B. Zhen
*Assistant Examiner* — Tewodros E Mengistu
(74) *Attorney, Agent, or Firm* — Kacvinsky Daisak Bluni PLLC

(57) ABSTRACT

Various embodiments are generally directed to techniques to reduce inputs of a machine learning model (MLM) and increase path efficiency as a result. A method for reducing an MLM includes: receiving a machine learning (ML) dataset, partitioning the ML dataset into a first dataset, a second dataset, a third dataset, and a fourth dataset, training, validating, and testing the MLM using one or more of the first dataset, the second dataset, and the third dataset, after testing the MLM, automatically ranking an importance associated with each input of the MLM using the fourth dataset, and reducing a plurality of inputs of the MLM based on the automatic ranking.

20 Claims, 11 Drawing Sheets

(56) References Cited

OTHER PUBLICATIONS

Chung et al, Performance Comparison of Several Feature Selection Methods Based on Node Pruning in Handwritten Character Recognition (Year: 1997).*

Han et al, Deep Compression: Compressing Deep Neural Networks with Pruning, Trained Quantization and Huffman Coding (Year: 2015).*

* cited by examiner

AUTOMATICALLY REDUCING MACHINE LEARNING MODEL INPUTS

BACKGROUND

The present invention relates to machine learning, and more particularly to enhancing the efficiency of machine learning models.

As the utility and range of applications for machine learning models increases, so does the size and complexity of the networks associated with the models. For example, models based on node networks, including but not limited to neural networks, have thousands, millions, and even billions of nodes (hidden and unhidden), and similarly, have vast numbers of inputs that have various travel paths associated with the network. Enhancing the efficiency of path trajectories of machine learning models, including but not limited to models associated with vast node networks, is beneficial from both an efficiency and accuracy perspective.

SUMMARY

One aspect of the present disclosure includes an apparatus for reducing the inputs of one or more machine learning models. The apparatus includes: a memory to store instructions, and processing circuitry, coupled with the memory, operable to execute the instructions, that when executed, cause the processing circuitry to: apply a reduced input machine learning model (MLM) to an applied dataset, the reduced MLM learning model being derived from an original MLM, the reduced input MLM generated by the original MLM having been trained using a first dataset, including generating a plurality of weights for the original MLM, validated using a second dataset, including validating at least one hyperparameter of the original MLM, tested by a third dataset, including evaluating i) an accuracy ability, ii) a precision ability, and iii) a recall ability of the original MLM, and pruned such that a plurality of inputs of the original MLM are removed based on a ranking generated by a fourth dataset, where each of the first dataset, the second dataset, the third dataset, and the fourth dataset is distinct from one another.

Another aspect of the present disclosure includes a computer implemented method for reducing the inputs of one or more MLMs. The computer implemented method includes: receiving a machine learning (ML) dataset, partitioning the ML dataset into a first dataset, a second dataset, a third dataset, and a fourth dataset, training, by a computer processor, a MLM based on the first dataset, where the training includes generating a plurality of weights for the MLM after training the MLM, validating at least one hyperparameter of the MLM based on the second dataset, after validating the MLM, testing i) an accuracy ability, ii) a precision ability, and iii) a recall ability using the third dataset, after testing the MLM, automatically ranking an importance associated with each input of the MLM using the fourth dataset, and reducing a plurality of inputs of the MLM based on the automatic ranking, where each of the first dataset, the second dataset, the third dataset, and the fourth dataset are distinct from one another.

Yet another aspect of the present disclosure includes a non-transitory computer-readable storage medium storing computer-readable program code for reducing one or inputs of one or more MLMs, the code executable by a processor to: train, by a computer processor, a MLM using a first dataset, where the training includes generating a plurality of weights for the MLM, validating at least one hyperparameter of the MLM using a second dataset, testing i) an accuracy ability, ii) a precision ability, and iii) a recall ability using a third dataset, automatically rank an importance associated with each input of the MLM using a fourth dataset, reduce a plurality of inputs of the MLM based on the automatic ranking, and after reducing the plurality of inputs of the MLM, retest the reduced input MLM using a fifth dataset, where the retesting includes testing i) an accuracy ability, ii) a precision ability, and iii) a recall ability of the reduced input MLM.

DETAILED DESCRIPTION

Figure 1A:
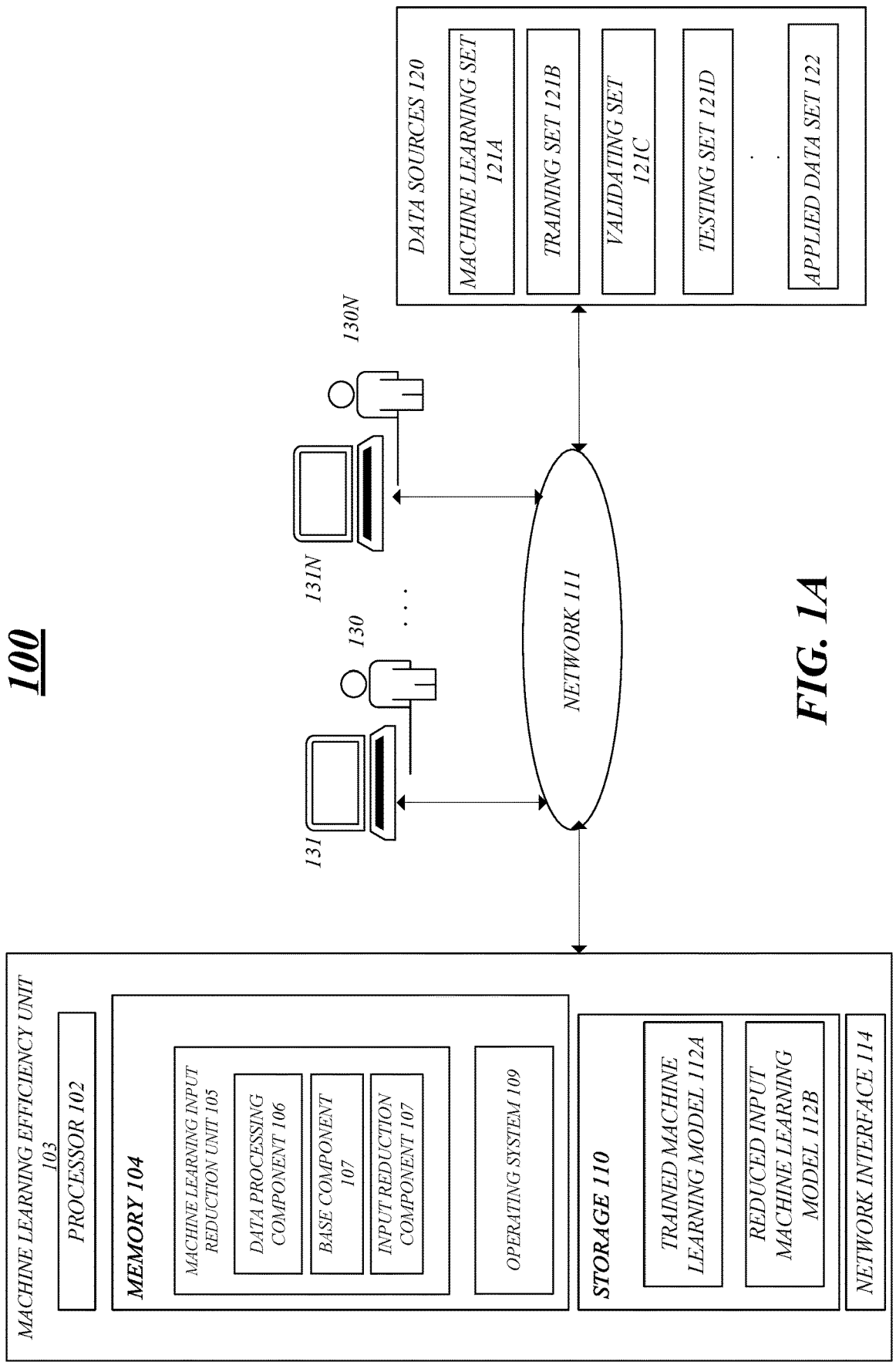
FIG. 1A illustrates an example of a system for reducing inputs of a machine learning model (MLM) according to at least one embodiment of the present disclosure.

Various embodiments are generally directed to techniques, systems, and flows to improve the functionality and efficiency of machine learning models (MLM). One or more embodiments include a system and/or one or more components associated with a system or systems that can reduce the number of inputs of an MLM. In one or more embodiments, the system for reducing inputs of an MLM includes a component that automatically partitions one or more data sources into one or more datasets for training an MLM, testing the trained MLM, and/or validating the trained MLM. Once the MLM is fully trained (and, if applicable, validated and tested), one or more components of the system generate another dataset from the one or more data sources, which is then used by one or more components of the system to reduce the number of inputs of the MLM. One or more components of the system can generate at least one distribution during the reduction operation that ranks the importance of each input of the MLM. The importance of each input is automatically determined by running a variance analysis by backpropagation, from the output to the inputs, using the fourth dataset, e.g., using the variant analysis and backpropagation technique to sum value of each weight along with a path associated with each input. Based on this summation, one or more components of the system can determine an importance value for each input of the MLM, and by extension, a basis for a distribution plot of importance in relation to input. The distribution ranking can then be used to reduce inputs with a smaller importance value in relation to other inputs, thus reducing the computing power in using the machine learning model and/or the memory required to store it for subsequent use. Also, by reducing inputs that are redundant and/or of little value, the MLM's accuracy on future out of sample datasets (e.g., samples not used in training, validation, testing, etc.) is also increased (by avoiding paths in the network or networks associated with the model, which adversely affect overall output).

The reduced input MLM can also be automatically retested using one or more training, testing, validation, and/or input reduction operations based on more data sources. This can further enhance the efficiency and accuracy of the model by further mitigating redundancies.

The system for reducing MLM inputs can look for gaps in the one or more importance distributions, such as the distance between a peak and a gap of a multiple peak, e.g. multimodal, Gaussian distribution(s) representing the importance of the inputs (based on a variant analysis employing any suitable backpropagation technique). Based on the gaps, one or more components of the system can automatically reduce the number of inputs and then plot all remaining inputs in relation to a normalized importance summation, and then reduce the number of features that remained after the initial reduction.

One or more benefits of at least one embodiment of the present disclosure is making an MLM scalable for different applications and adjustable for different computing environments, without compromising the accuracy of the model. As inputs are reduced, an MLM can be used in computing environments with less memory and computer processing resources, e.g. mobile phones, tablets, etc. Another benefit of at least one embodiment of the present disclosure, in addition to making an MLM more efficient from a computer resource perspective, is enhancing the accuracy of the MLM by pruning redundant inputs associated with the MLM, e.g. inputs that have a very low importance value (from a weighted perspective in relation to their individual paths) are removed and only higher value/importance inputs are employed.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1A illustrates an example of a machine learning efficiency system 100 that can reduce one or more inputs of an MLM to increase the accuracy and efficiency of the MLM. The "units" or "components" described in the system, whether contained in memory or otherwise employed therein, can be any suitable software, logic (hardware or software), or hardware element specifically configured to perform or be used in the performance of one or more tasks or functions as discussed herein.

In one or more embodiments, the machine learning efficiency system 100 can include a machine learning efficiency unit 103, which in turn includes one or more processors 102, memory 104, storage 110 and a network interface 114. The one or more processors 102 can be any suitable software or hardware computer components for carrying out any operation as discussed herein. The memory 104 can be any suitable component or unit for storing protocols, information, algorithms, and/or instructions for execution by the one or more processors, e.g., the memory 104 may be any volatile and/or non-volatile memory capable of storing information during and/or for execution of instructions. The devices, systems, sources, units and/or components of the machine learning efficiency unit 103 can be coupled to a network 111, e.g., the Internet, via one or more wired and/or wireless network links, and can be accessed by one or more network interfaces 114.

In one or more embodiments, the machine learning efficiency unit 103 can interact with one or more users or clients 130 . . . 130N (and associated user/client computing devices 131 . . . 131N, e.g., a laptop, mobile phone, tablet, or desktop computer) via a network interface 114 that can access the network 111, and the machine learning efficiency unit 103 can interact with one or more data databases or data sources 120, such as one or more datasets, also via the network interface accessing the network 111. In one or more embodiments the one or more data sources can include any suitable database or dataset 121A (a machine learning or "ML" dataset) that can be used in one or more operations involved with training and improving a machine learning model. The database or dataset (referred to interchangeable herein) 121A can be portioned into one or more other datasets that constitute a percentage of the data of the overall dataset 121A. For example, the partition can include a training set 121B for training an MLM, a validating set 121C for validating an MLM, testing set 121D for testing an MLM, and a machine learning (ML) or applied dataset 122 that can be used to reduce the inputs of the MLM.

In one or more embodiments, an operation or operations associated with a training dataset 121B can involve training the initial MLM, an operation or operations associated with a validating set 121C can involve tuning hyperparameters of an MLM (and assessing the performance of an MLM in light of the hyperparameter tuning), and an operation or operations associated with testing dataset 121D can be to test the finally trained and tuned MLM. In one or more embodiments, each database or dataset 121B, 121C, and 121D contain no overlapping data, even if the sets 121B, 121C, and 121D stem from the same source 121A.

In one or more embodiments, the applied dataset 122 can be a subset of dataset 121A or completely distinct therefrom. In one embodiment, the applied dataset 122 can have overlapping data with one or more datasets 121B, 121C, and 121D, and in another embodiment, there is no overlap between the data contained in dataset 122 and sets 121B, 121C, and 121D.

In one or more embodiments, the memory 104 can include a machine learning input reduction unit 105 and an operating system 109, where the operating system 109 can be any suitable operating system compatible with system 100. In one or more embodiments, the machine learning input reduction unit 105 can further include a data processing component 106 and an input reduction component 108.

In one or more embodiments, the one or more components of the machine learning efficiency unit 103 perform one or more operations to train, validate, and test an MLM and then reduce the inputs associated therewith. In one or more embodiments, one or more components of the machine learning efficiency unit 103 can receive a fully or partially trained model and perform one or more operations to develop further the model, including reducing the inputs associated therewith. In one or more embodiments, one or more components of the machine learning efficiency unit can automatically partition one or more datasets, e.g. 121A, into multiple datasets, e.g. 121B-121D, and use the datasets to train a model from the beginning, and then perform one or more operations to reduce the inputs associated therewith. The operation to train, validate, test, and/or reduce the inputs of the MLM can be initiated from the one or more users 130 . . . 130N via one or more user computing devices 131 . . . 131N, or the operations can otherwise be manually or automatically initiated by any suitable entity.

In one or more embodiments, the machine learning efficiency unit 103 is configured to automatically, upon initiation of a user 130 . . . 130N or any other suitable trigger, partition machine learning model dataset 121A into training set 120B, validation set 121C, and testing set 121D. Thereafter, it will automatically train an MLM 112A using dataset 121B, validate the machine learning model 112A using training set 121C, and test the machine learning model 112A using testing set 121D. In one or more embodiments, the fully trained MLM 112A can be stored in any suitable storage component of the system 100, such as storage 110. Once the MLM 112A is trained, the machine learning unit 103 is configured to reduce or prune the inputs of the trained MLM 112A using applied dataset 122 by applying a variant analysis and backpropagation technique to the MLM 112A, thus generating a reduced (or pruned) input MLM 112B, where MLM 112B can also be stored in storage 110.

Embodiments are not limited in the above manner, and the above system is merely an exemplary embodiment for implementing one or more features of the present disclosure.

In one or more embodiments, one or more users 130 . . . 130N (or any other suitable entity can make the request) can initiate a request to the machine learning efficiency unit 103 to train an MLM via network 111. Alternatively, an already trained MLM can be provided for additional operations to the machine learning efficiency unit 103, e.g., a model stored on one or more user devices 131 . . . 131N.

In one or more embodiments, the data processing component 106 will automatically partition a dataset 121A into one or more datasets 121B, 121C, and 121D for the purposes as outlined above and/or it will obtain a dataset, e.g., applied dataset 122, that can be used to reduce or prune the inputs of an MLM.

In one or more embodiments, the input reduction component 108 will perform one or more operations to reduce or prune the inputs of the MLM. In one or more embodiments, the MLM can be MLM 112A, where the one or more users 130 . . . 130N provide a trained MLM 112A, or alternatively, the input reduction component 108 will coordinate with base application component 107 to receive a base application or protocol for forming an MLM, e.g., the instructions and purpose associated with a to be trained MLM 112A, and the input reduction component will perform one or more operations to train an MLM 112A using the one or more data sources 120, where in one or more embodiments the trained MLM 112A can be stored in storage 110 (fully trained or partially trained), In one or more embodiments, the input reduction component 108 can apply a backpropagation technique at the output of MLM 112A using applied dataset 122 in order to assess the importance of each input of the MLM 112A. The backpropagation may involve a variant analysis, e.g. any suitable statistical method that assesses the relative importance of the inputs in relation to one another, including an assessment of the weighted values of nodes (or neurons in the case of a neural network) that follow the path of each input, although by starting at the output and tracing backward. After performing the backpropagation, and based on the results therefrom, the input reduction component 108 may reduce or prune one or more inputs of the MLM 112A, thus forming a reduced (or pruned) input MLM 112B. In one or more embodiments, the reduced (or pruned) input MLM 112B can be stored in storage 110.

In one or more embodiments, the input reduction component 108 may generate one or more plot distributions of the importance associated with each input of the MLM, e.g., a Gaussian distribution with one or more maximum and minimum peaks, e.g. a multimodal Gaussian distribution. The distribution(s) may plot the importance of each input of MLM 112A derived from the backpropagation operation, and based on the distributions, the input reduction component 108 may reduce or prune the inputs of MLM 112A to create reduced (or pruned) input MLM 112B.

In one or more embodiments, the reduced input MLM 112 offers one or more advantages as a result of having certain inputs removed, including improving the efficiency of the MLM by minimizing redundancy and errors inherent with certain paths or networks associated with particular inputs of MLM 112A, and by reducing the computer resources required to process and store the reduced MLM 112B, it is more conducive for storage in smaller devices such as mobile phones and tablets.

Figure 1B:
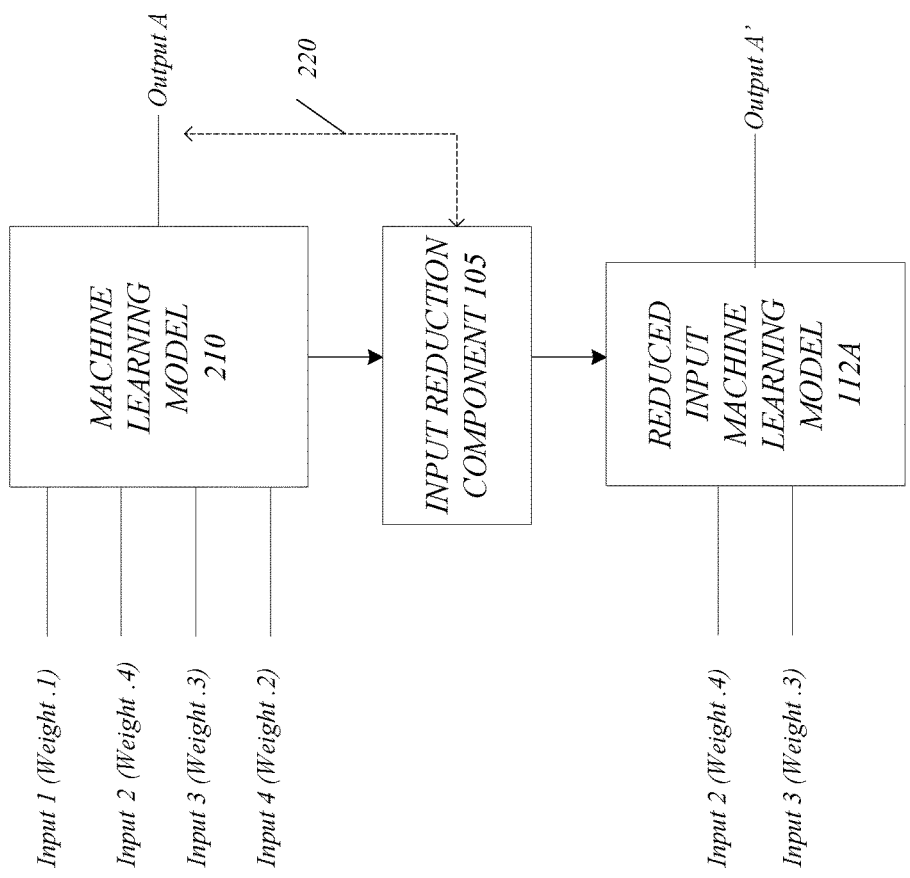
FIG. 1B illustrates an example of a system for reducing inputs of a MLM according to at least one embodiment of the present disclosure.

FIG. 1B illustrates a configuration 101 for using one or more components of machine learning efficiency system 100 to apply a variant analysis and backpropagation technique to one or more MLMs, e.g., MLM 112A. In one or more embodiments, the machine learning efficiency unit 103 may interact with data sources 120 and MLM 112A as outlined above. The machine learning efficiency unit 103 can fully develop MLM 112A using datasets 121A, 121B, 121C, and 121D. Alternatively, a fully trained MLM 112A can be provided by one or more users or by any other suitable method. In one or more embodiments, the machine learning efficiency unit 103 may apply a backpropagation operation 220 to perform a variant analysis of each input of the fully trained MLM 112A. Although four inputs are shown in FIG. 1B for purposes of simplicity, in one or more embodiments, hundreds, thousands, millions, or more inputs are possible. In one or more embodiments, dataset 122 can be used by the machine learning efficiency unit 103 to perform the variant analysis and backpropagation technique. The backpropagation 220 operation can determine the importance of each input performing any suitable machine learning or statistical analysis technique starting from the output A to the various inputs, e.g. determine the path importance associated with each input by assessing the accuracy of running data through certain paths and input and not others, and determining the accuracy or difference in accuracy when omitting and/or using one input in relation to another. Accordingly, in one or more embodiments, the variance or relative importance of each input is determined by running a separate dataset from the output A through the inputs.

Figure 2A:
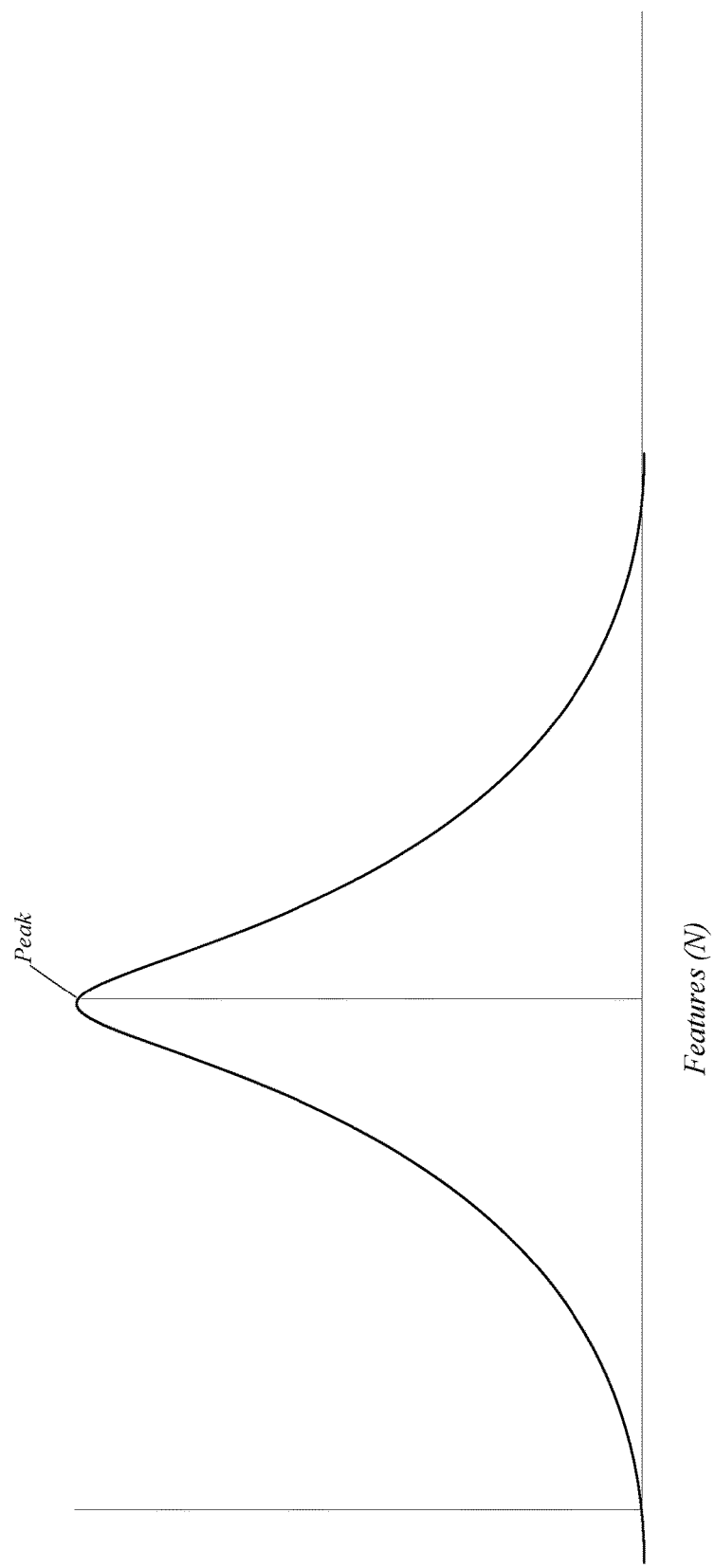
FIG. 2A illustrates one type of distribution ranking for a plurality of MLM inputs according to at least one embodiment of the present disclosure.
Figure 2B:
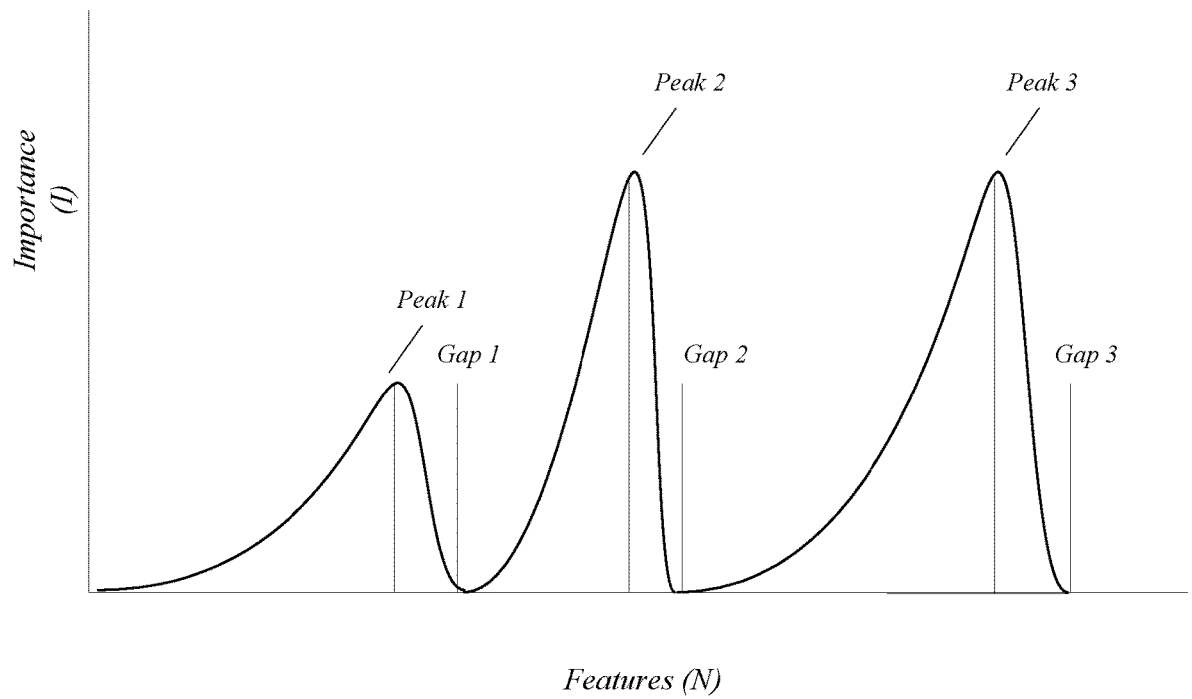
FIG. 2B illustrates one type of distribution ranking for a plurality of MLM inputs according to at least one embodiment of the present disclosure.
Figure 2C:
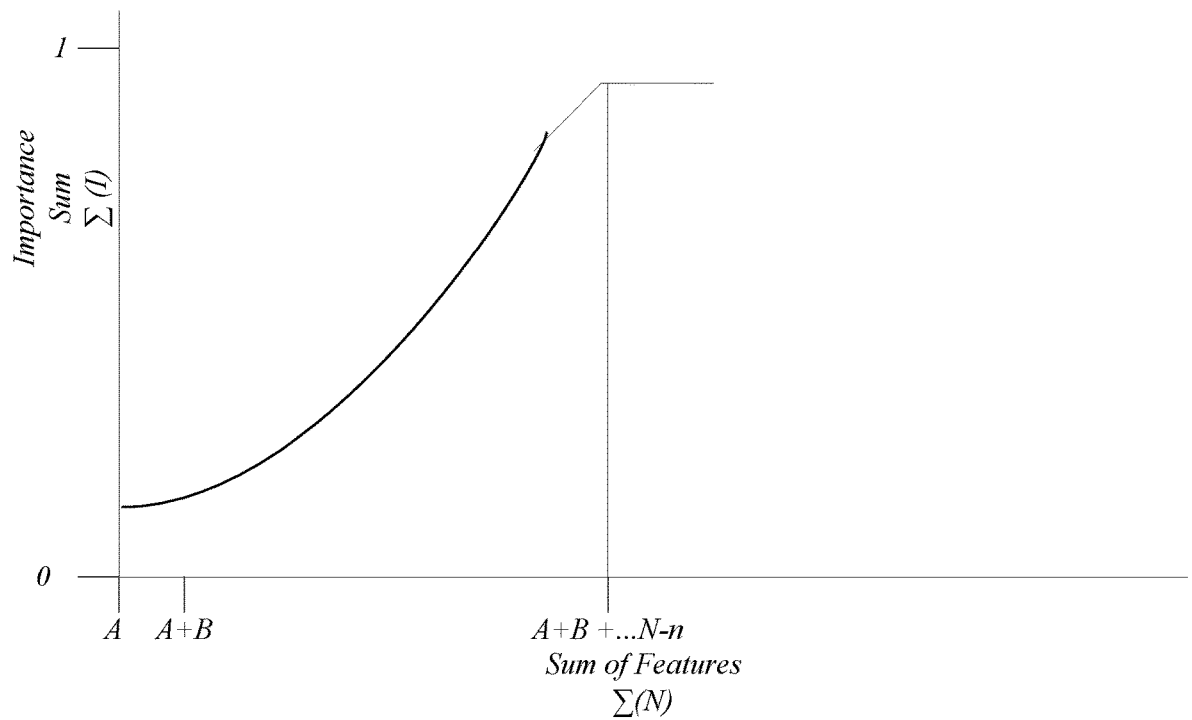
FIG. 2C illustrates one type of plot of a summation of an importance score of MLM inputs in relation to the number of MLM inputs according to at least one embodiment of the present disclosure.

In the example provided in FIG. 1B, as stated, four inputs are shown: Input 1, Input 2, Input 3, and Input 4. The input weights represent the importance of each input and are normalized to add up to a particular number, where the summed number represents running every path and every input. For example, in FIG. 1B, the normalized number is "1" and the weights of each input, e.g., "0.1" for Input 1, "0.4" for Input 2, "0.3" for Input 3, and "0.2" for Input 4. In one or more embodiments, once the machine learning efficiency unit 103 determines the importance of each input by backpropagation 210, it can plot the variant analysis results as one or more distributions or graphs, as shown in FIG. 2A, FIG. 2B, and FIG. 2C. Based on the plot results, the machine learning efficiency unit 103 can remove the least important input features. It is noted here, and discussed below, that FIGS. 2A-2C are directed to embodiments where there are a significant number of inputs or features (N), but the same analysis and technique can apply to FIG. 1B. As shown, after the backpropagation and variant analysis is performed by the machine learning efficiency unit 103, only Input 3 and Input 1, the features with the highest importance, remain, and all other features, i.e., Input 2 and Input 4 are removed, thus producing MLM 112B. In one or more embodiments, more than one graphical operation and/or plot (discussed below) is performed/used to ultimately determine the number of inputs to be reduced (or pruned) for the reduced input MLM.

FIG. 2A illustrates one type of graphical result 200A that can be obtained from one or more components of the present disclosure performing a backpropagation and variant analysis on an MLM. The graphical result 200A is a simple Gaussian distribution that has a single peak "Peak A" associated therewith. Importance (I) is plotted with respect to every feature or input of MLM, e.g., labeled "Features (N)," in 200A. Peak A represents the input with the highest importance, with all inputs thereafter having a declining value. In this embodiment, a threshold (not shown) can be set after Peak A, and any inputs after the threshold are automatically excluded from the reduced input MLM.

FIG. 2B illustrates one type of graphical result 200B that can be obtained from one or more components of the present disclosure performing a backpropagation and variant analysis on an MLM. The graphical results 200B represents a more complicated distribution with multiple peaks (e.g. multimodal), e.g., Peak 1, Peak 2, and Peak 3, and multiple gaps, e.g., Gap 1, Gap 2, and Gap 3 in between the peaks. As with FIG. 2A, Importance (I) is plotted with respect to every feature or input of MLM, e.g., labeled "Features(N)." In one or more embodiments, the machine learning efficiency unit 103 can be configured to eliminate a predetermined number of inputs between gaps and peaks and/or perform a more sophisticated analysis that eliminate inputs based on a particular mathematical computation, e.g., a derivative computation, in relation to one part of the curve 200B and another part of the curve 200B, e.g., a determined descending derivative value through the gaps and up until an ascending derivative value is reached. Once this initial reduction takes place, the machine learning efficiency unit can generate a second curve 200C as shown in FIG. 2C. The curve plots the normalized Importance Sum $\Sigma(I)$ in relation to the Sum of Features $\Sigma(N)$, i.e., the sum of the importance of the inputs that were kept from the graphical result 200B. In other words, the curve represents an ascending sum of the kept inputs from result 200B, the weight of the first feature or input added to the next feature or input and so on, from most important feature or input A, all the way through A added with all inputs up and including "N-n." The maximum value of the Importance Sum $\Sigma(I)$ is a normalized value that would include all inputs if included, e.g., "1." The feature "N-n" represents the input where a dramatic reduction in the increase of the sum occurs as the weighted value of a feature or inputs is added to the preceding value. That occurrence (dramatic reduction) and associated feature or input can be determined using any suitable mathematical operation for determining the slowdown in the value of a curve growth. Once that value and associated feature or input N-n is determined, all subsequent features or inputs are omitted from the final reduced input MLM.

Although with respect to FIG. 2B and FIG. 2C two graphical operations are performed to obtained the reduced input MLM, either of the two types of graphical operations can be performed multiple times to further reduce inputs as needed for a particular application, e.g. if the MLM is intended for a device with limited storage, this operation could be carried out multiple times until the size of the reduced input MLM aligns with the memory capacity of that device. Similarly, although the above discussion is limited to training, validating, and testing an MLM using three distinct datasets, e.g., 121B, 121C, and 121D and then a fourth dataset to reduce the inputs of the MLM, after a reduced MLM, e.g., 112B, is created, it can be subsequently tested with different datasets, e.g. a fourth dataset for training the reduced input MLM, a fifth dataset for validating the reduced input MLM, and a sixth dataset for testing the reduced input MLM, where the fourth, fifth, and sixth datasets are distinct from datasets 121B, 121C, 121D, and 122, does not share any overlapping data in relation thereto. Once the reduced MLM 112B is fully retrained, another dataset, e.g., a seventh dataset, can be used to reduce the inputs of the reduced input MLM using another iteration of backpropagation and variant analysis by one or more components as described herein, where the seventh dataset is distinct and does not share any overlapping data with respect to 121B, 121C, 121D, 122, and any other datasets used on the reduced input MLM, e.g., the fourth, fifth, and sixth dataset.

Figure 3A:
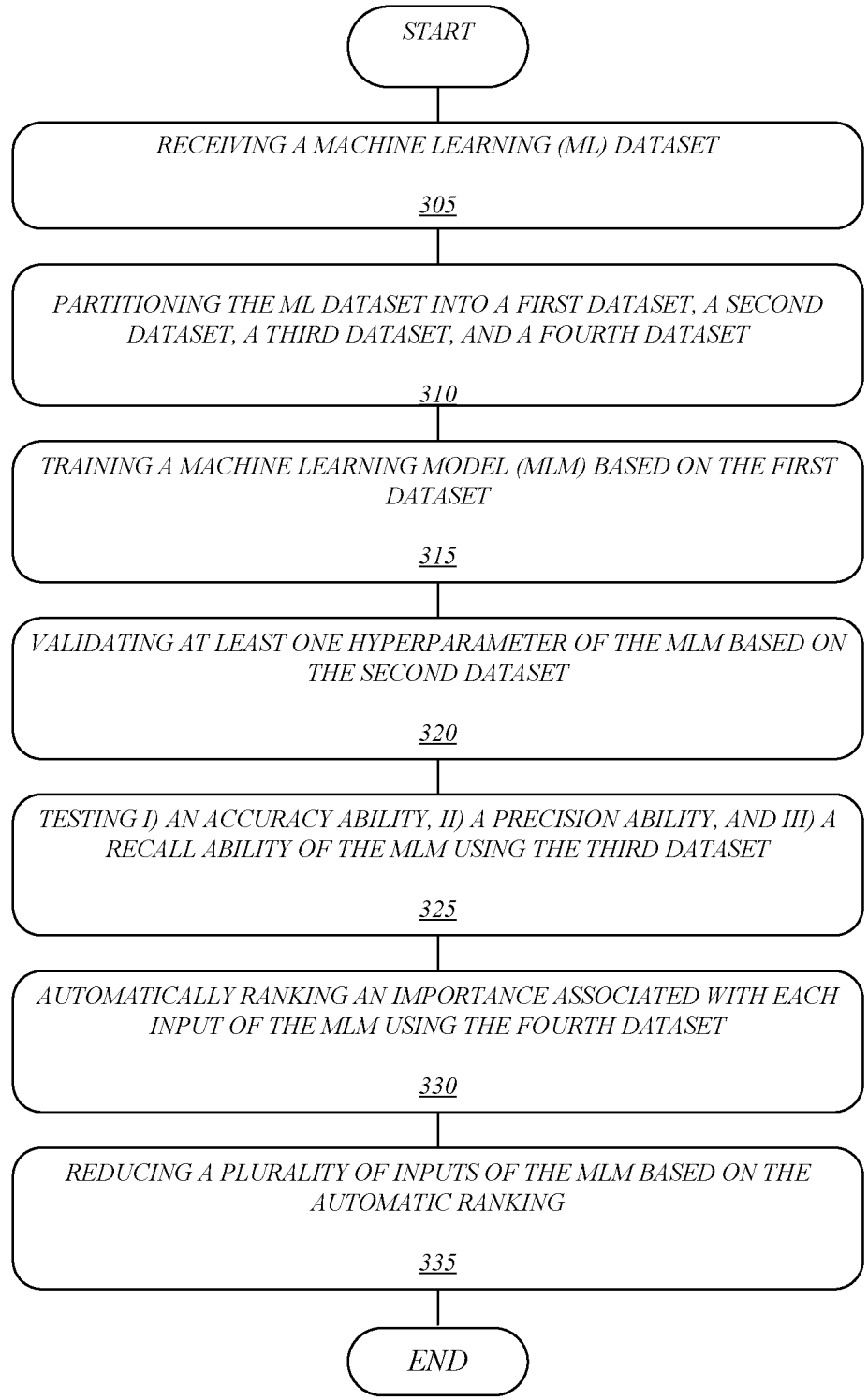
FIG. 3A/3B illustrate examples of one or more processing flows for reducing one or more inputs of an MLM according to at least one embodiment of the present disclosure.

FIG. 3A illustrates an example of a logic flow 300A that may be representative of some or all of the operations executed by one or more embodiments described herein. For example, the logic flow 300A may illustrate operations performed by a machine learning efficiency system to reduce the inputs of one or more inputs of an MLM.

At block 305, one or more embodiments may include receiving a generic machine learning dataset or ML dataset. The machine learning dataset can be provided by one or more users over a network and to a device or component as described in one or more embodiments herein, or it may be pre-stored in a system or component as described herein.

At block 310, one or more embodiments involve automatically partitioning, using any suitable component as described herein or otherwise consistent with the teachings as outlined herein, the ML dataset into one or more other datasets for fully developing an MLM, including a first dataset, a second dataset, a third dataset, and a fourth dataset. In one or more embodiments, the first dataset can be for training the MLM, the second dataset can be for validating the MLM, the third dataset can be for testing the MLM, and the fourth dataset can be for reducing one or more inputs of the MLM. In one or more embodiments, the first, second, third, and fourth datasets do not share any data in common.

At block 315, one or more embodiments involve automatically training the MLM using the first dataset. In one or more embodiments, the first (training) dataset may contain the largest amount of data in relation to the second dataset, the third dataset, and the fourth dataset, and one or more components of any suitable system as described herein may provide a learning algorithm, the type of which is contingent on the type of MLM ultimately preferable to a particular application or use-case, and use that learning algorithm to train the MLM.

At block 320, one or more embodiments involve automatically validating the MLM using the second dataset. In one or more embodiments, the second (validation) dataset may be the second largest dataset with respect to the first dataset, the second dataset, the third dataset, and the fourth dataset. In one or more embodiments, the trained MLM from block 315 will be validated using the second dataset, e.g., one or more hyperparameters or any relevant external factor that can affect the MLM in real-time usage will be tuned or optimized using the second dataset. In one or more embodiments, factors that can be addressed in validation include but are not limited to the optimal size of input data, optimal prediction outputs, and the scope and/or a classifiable difference between inputs.

At block 325, one or more embodiments involve automatically testing the MLM using the third dataset. In one or more embodiments, the third (testing) dataset may be the third largest dataset with respect to the first dataset, the second dataset, the third dataset, and the fourth dataset. In one or more embodiments, the validated MLM from block 320 may be tested to determine any suitable error rate, where the error rate can be adjusted by reperforming the operations of blocks 310-320. In one or more embodiments, the MLM will be tested with respect to one or more of an accuracy ability or feature, a precision ability or feature, and/or a recall ability or feature.

At block 330, one or more embodiments involve ranking importance of one or more inputs of the MLM using the fourth dataset. In one or more embodiments, the fourth (applied or ML) dataset may be the smallest dataset with respect to the first, second, third, and fourth datasets. The ranking can be any suitable ranking technique that considers the weight or importance of each input in relation to a path trajectory associated with that input and the MLM, and/or any suitable ranking technique that considers the accuracy or error-rate associated with a particular input when processed using the fourth dataset.

At block 335, one or more embodiments involve reducing the input of the MLM, after it has been fully developed (trained, validated, and tested) and the rankings of the inputs are ranked in accordance with block 330. The reduction can take any approach to reduce the inputs based on the rankings, as described herein, or as otherwise suitable, including but not limited to reducing inputs based on a graphical distribution.

Figure 3B:
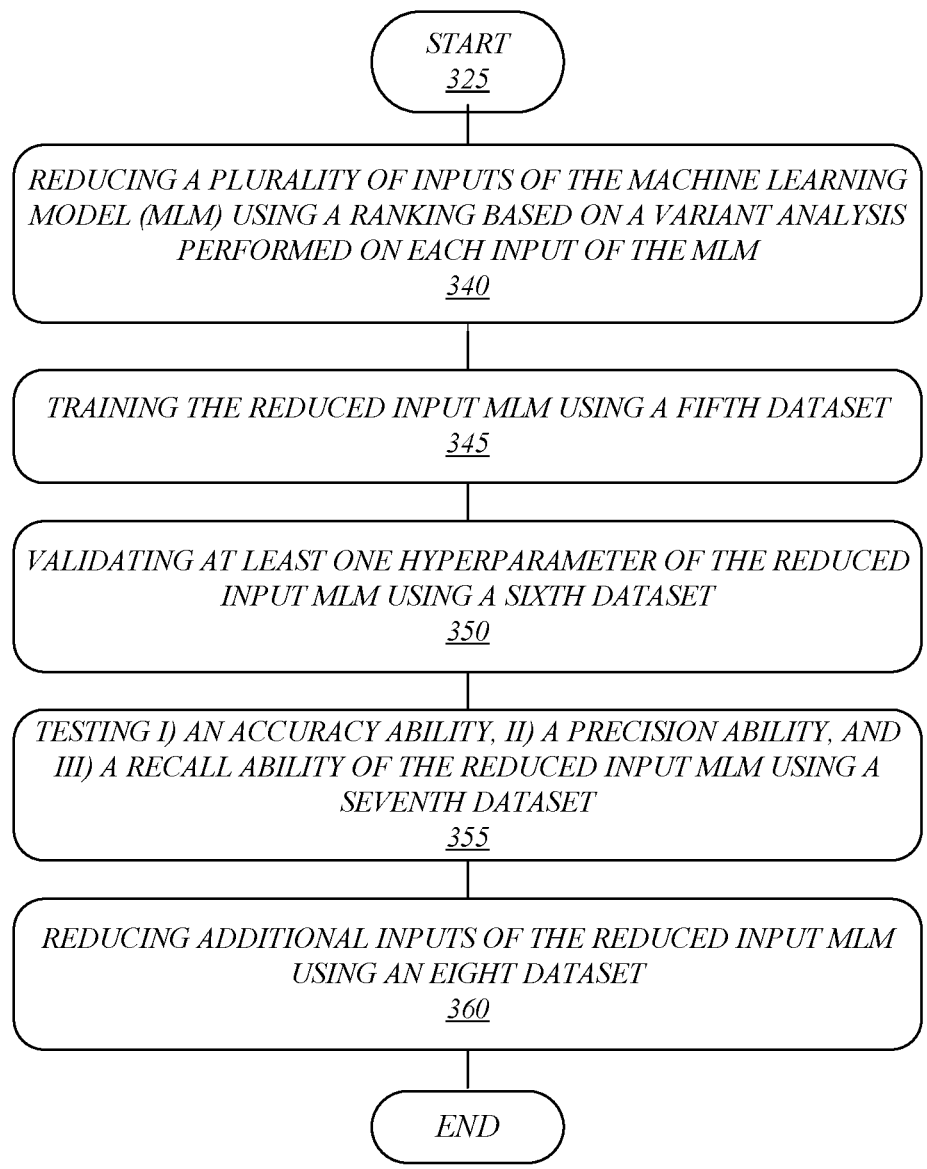

FIG. 3B illustrates an example of a logic flow 300B that may be representative of some or all of the operations executed by one or more embodiments described herein. For example, the logic flow 300B may illustrate operations performed by a machine learning efficiency system to reduce the inputs of one or more inputs of an MLM. In one or more operations, the flow performs begins at block 325 of flow 300A, and from block 325, proceeds directly to block 340.

At block 340, one or more embodiments involve reducing a plurality of inputs of an MLM using a ranking based on a variant analysis and backpropagation technique MLM. The variant analysis can apply the fourth dataset at the output of the trained, validated, and tested MLM to backpropagate a determination as to the importance of each input of the MLM. One or more graphical distributions of the importance value of each input of the MLM can be determined based on the backpropagation technique. In one or more embodiments, based on at least one graphical distribution, e.g., a topography of a Gaussian distribution, inputs of the MLM are removed, and the reduced MLM can be used in one or more applications as intended. In another one or more embodiments, the reduced inputs of the reduced input MLM will be plotted a second time in relation to importance, and based on the topography of the second graph, additional inputs of the reduced input MLM will be reduced.

At block 345, one or more embodiments involve training or retraining the reduced input MLM using a fifth dataset. The retraining can be in accordance with the techniques described herein, including the operation or operations associated with block 315, provided that, in one or more embodiments, the fifth dataset does not share any data in common with the first, second, third, and fourth datasets (and, as discussed below, with respect to the sixth, seventh, and eighth datasets). In one or more embodiments, the fifth dataset can be derived from the ML dataset of 305, or it can be derived from a completely new source.

At block 350, one or more embodiments involve validating or revalidating the reduced input MLM using a sixth dataset. The revalidating can be in accordance with the techniques described herein, including the operation or operations associated with block 320, provided that, in one or more embodiments, the sixth dataset does not share any data in common with the first, second, third, fourth, and fifth datasets (and as discussed below, with respect to the seventh and eighth datasets). In one or more embodiments, the sixth dataset can be derived from the ML dataset of 305, or it can be derived from a completely new source.

At block 355, one or more embodiments involve testing or retesting the reduced input MLM using a seventh dataset. The retesting can be in accordance with the techniques described herein, including the operation or operations associated with block 325, provided that, in one or more embodiments, the seventh dataset does not share any data in common with the first, second, third, fourth, fifth, and sixth datasets (and, as discussed below, eighth dataset). In one or more embodiments, the seventh dataset can be derived from the ML dataset of 305, or it can be derived from a completely new source.

At block 360, one or more embodiments involve further reducing the reduced input MLM using an eighth dataset. The reduction of the inputs can be in accordance with any of the techniques discussed herein, including one or more operations of block 340 (performing another backpropagation and variance analysis), provided that, in one or more embodiments, the eighth set does not share any data in common with the first, second, third, fourth, fifth, sixth and seventh datasets. In one or more embodiments, the eighth dataset can be derived from the ML dataset of 305, or it can be derived from a completely new source.

In one or more embodiments, performing one or more operations of flow 300B can further enhance an accuracy of a reduced input MLM, and with respect to one or more operations of block 360, further reducing the inputs of an already reduced input MLM can make the model suitable for a smaller device or another scenario where computing and or memory resources are limited, and without compromising the utility and/or accuracy of the final model when used for its intended purpose.

Figure 4:
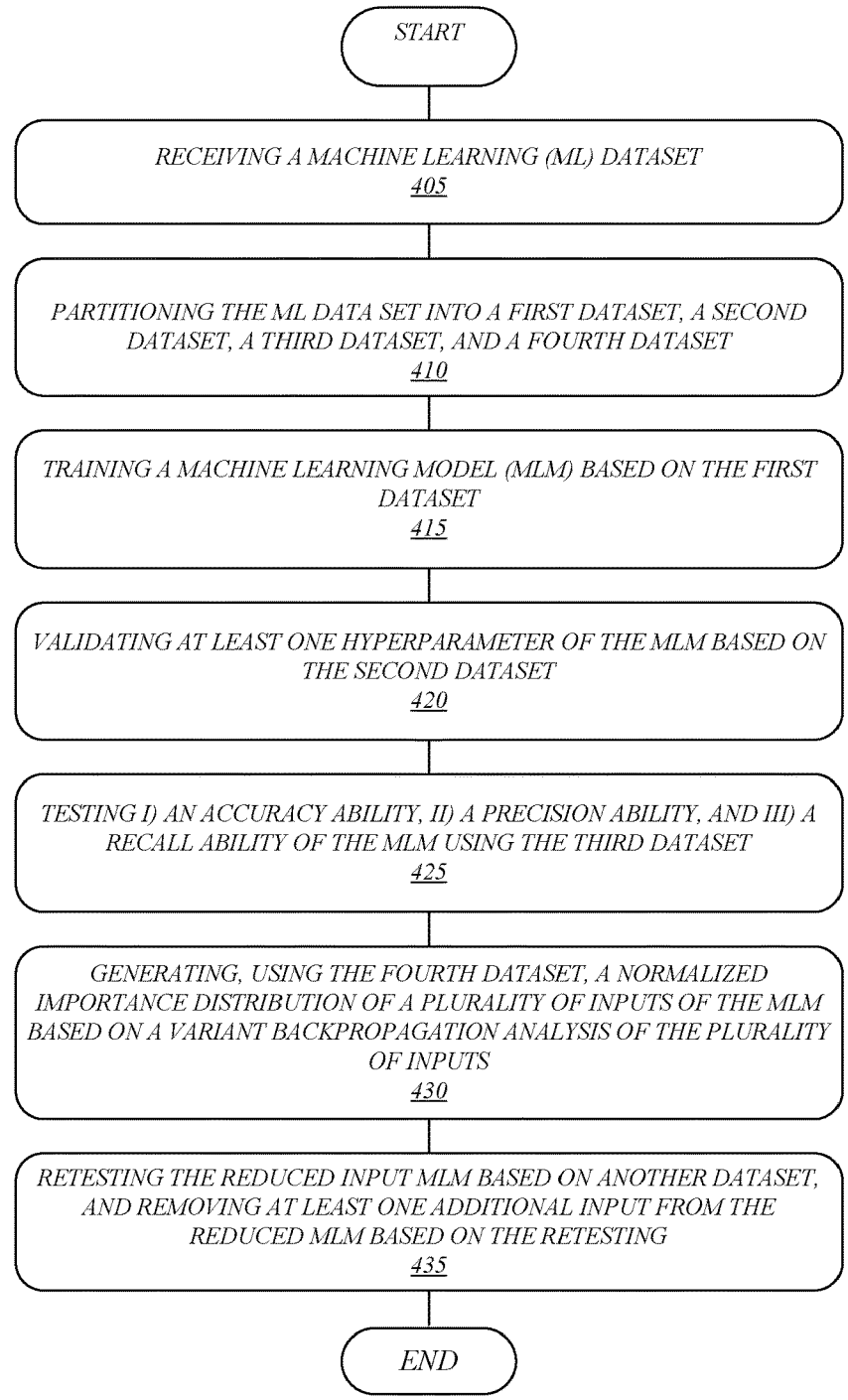
FIG. 4 illustrates at least one example of one or more processing flows for reducing one or more inputs of an MLM according to at least one embodiment of the present disclosure.

FIG. 4 illustrates an example of a logic flow 400 that may be representative of some or all of the operations executed by one or more embodiments described herein. For example, the logic flow 400 may illustrate operations performed by a machine learning efficiency system to reduce the inputs of one or more inputs of an MLM.

At block 405, one or more embodiments may include receiving a generic machine learning dataset or ML dataset. The machine learning dataset can be provided by one or more users over a network and to a device or component as described in one or more embodiments herein, or it may be pre-stored in a system or component as described herein.

At block 410, one or more embodiments involve automatically partitioning, using any suitable component as described herein or otherwise consistent with the teachings as outlined herein, the ML dataset into one or more other datasets for fully developing an MLM, including a first dataset, a second dataset, a third dataset, and a fourth dataset. In one or more embodiments, the first dataset can be for training the MLM, the second dataset can be for validating the MLM, the third dataset can be for testing the MLM, and the fourth dataset can be for reducing one or more inputs of the MLM. In one or more embodiments, the first, second, third, and fourth datasets do not share any data in common.

At block 415, one or more embodiments involve automatically training the MLM using the first dataset. In one or more embodiments, the first (training) dataset may contain the largest amount of data in relation to the second dataset, the third dataset, and the fourth dataset, and one or more components of any suitable system as described herein may provide a learning algorithm, the type of which is contingent on the type of MLM ultimately preferable to a particular application or use-case, and use that learning algorithm to train the MLM.

At block 420, one or more embodiments involve automatically validating the MLM using the second dataset. In one or more embodiments, the second (validation) dataset may be the second largest dataset with respect to the first dataset, the second dataset, the third dataset, and the fourth dataset. In one or more embodiments, the trained MLM from block 315 may be validated using the second dataset, e.g., one or more hyperparameters or any relevant external factor that can affect the MLM in real-time usage will be tuned or optimized using the second dataset. In one or more embodiments, factors that can be addressed in validation include but are not limited to the optimal size of input data, optimal prediction outputs, and the scope and/or the classifiable difference between inputs.

At block 425, one or more embodiments involve automatically testing the MLM using the third dataset. In one or more embodiments, the third (testing) dataset may be the third largest dataset with respect to the first dataset, the second dataset, the third dataset, and the fourth dataset. In one or more embodiments, the validated MLM from block 320 may be tested to determine any suitable error rate, where the error rate can be adjusted by reperforming the operations of blocks 410-420. In one or more embodiments, the MLM may be tested with respect to one or more of an accuracy ability or feature, a precision ability or feature, and/or a recall ability or feature.

At block 430, one or more embodiments involve generating, using the fourth dataset, a normalized importance distribution of a plurality of inputs of the MLM based on a variant backpropagation analysis of the plurality of inputs. The normalized importance distribution can be a first graph that plots the progressive aggregated summation of a weighted value representing each input in relation to a single value that would include keeping every input of the MLM, e.g., 1, or the normalized importance distribution can be a second graph that is based on a reduced set of inputs derived from a first graph that plotted each input in relation to its weighted importance value. In one or more embodiments, the second graph could be a progressive aggregated summation of a weighted value representing each input in relation to a single value that would include keeping every input of the MLM, e.g., 1, At block 435, one or more embodiments involve performing at least one or more operation on the reduced input MLM based on another dataset and removing at least one additional input from the reduced MLM based on that at least one operation. The at least one more operation can be one or more of an additional training operation, validating operation, testing operation, or input reduction operation, where each additional operation can use a distinct dataset from the first, second, third, and fourth dataset, and with respect to the dataset used in each other additional operation.

Figure 5:
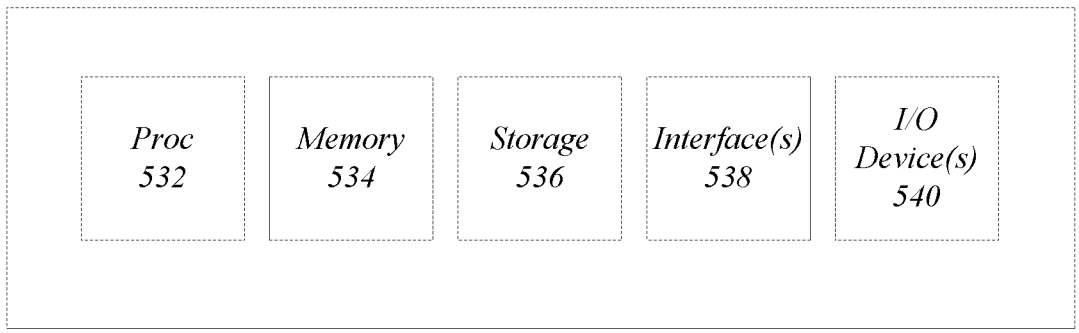
FIG. 5 illustrates a machine learning system according to an embodiment of the present disclosure.

FIG. 5 illustrates an example of a machine learning efficiency system 506. The machine learning efficiency system 506 includes one or more processor(s) 532, memory 534, storage 536, one or more interface(s) 538, and one or more I/O device(s) 540. In embodiments, the machine learning efficiency system 506 may be a processing system that includes one or more servers or computing devices that are interconnected via one or more network links, e.g., wired, wireless, fiber, etc. In some instances, the transaction services system may be a distributed computing system. Each of the servers may include one or more processor(s) 532, which may include one or more processing cores to process information and data. Moreover, the one or more processors 532 can include one or more processing devices, such as a microprocessor manufactured by Intel™, AMD™, or any of various processors. The disclosed embodiments are not limited to any type of processor(s).

Memory 534 can include one or more memory (volatile or non-volatile) devices configured to store instructions used by the one or more processors 532 to perform one or more operations consistent with the disclosed embodiments. For example, memory 534 can be configured with one or more software instructions, such as programs that can perform one or more operations when executed by the one or more processors 532. The disclosed embodiments are not limited to separate programs or computers configured to perform dedicated tasks. For example, memory 534 can include a single program that performs the operations or could comprise multiple programs. Memory 534 can also store data that can reflect any type of information in any format that the system can use to perform operations consistent with the disclosed embodiments.

In embodiments, the transaction services system 504 may include one or more storage devices 536. The storage devices 536 may include HDDs, flash memory devices, optical storage devices, floppy storage devices, etc. In some instances, the storage devices 556 may include cloud-based storage devices that may be accessed via a network interface. In some embodiments, the storage 536 may be configured to store one or more databases and/or as a distributed database system to store information and data. Databases can include one or more memory devices that store information and are accessed and/or managed through the transaction services system 504. By way of example, databases can include Oracle™ databases, Sybase™ databases, or other relational databases or non-relational databases, such as Hadoop sequence files, HBase, or Cassandra. The databases or other files can include, for example, data and information related to the source and destination of a network request, the data contained in the request, transaction information, etc. Systems and methods of disclosed embodiments, however, are not limited to separate databases. In one aspect, transaction services system 504 can include databases located remotely from other transaction services system 504 devices. The databases can include computing components (e.g., database management system, database server, etc.) configured to receive and process requests for data stored in memory devices of databases and to provide data from databases.

Figure 6:
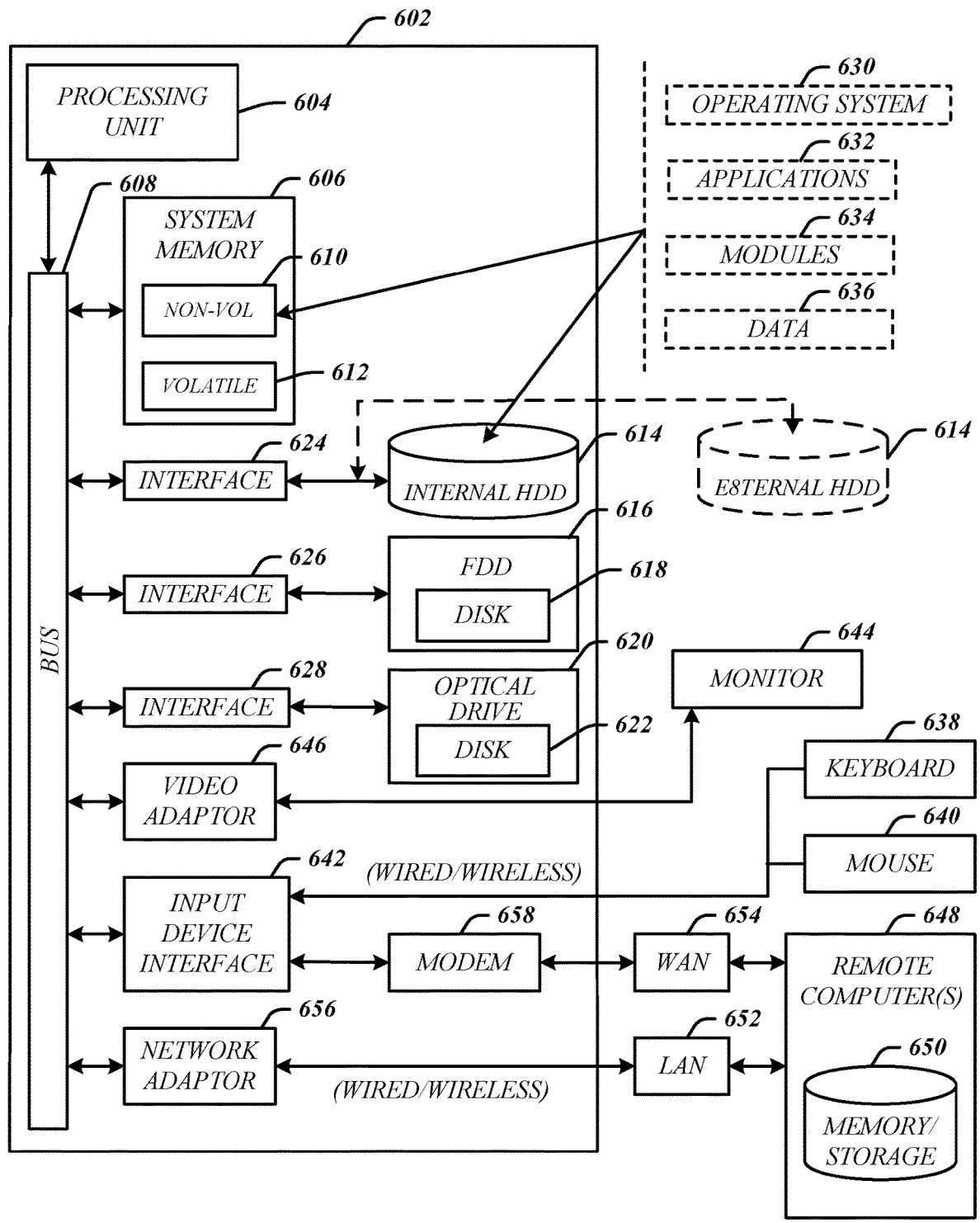
FIG. 6 illustrates an embodiment of a computing architecture useful with at least one embodiment of the present disclosure.

FIG. 6 illustrates an embodiment of an exemplary computing architecture 600 suitable for implementing various embodiments as previously described. In one embodiment, the computing architecture 600 may include or be implemented as part of system 100.

As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 includes a processing unit 604, a system memory 606 and a system bus 608. The processing unit 604 can be any of various commercially available processors.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system 700.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 604 through an input device interface 642 that is coupled to the system bus 608 but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth. The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654 or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 602 family of standards, such as wireless devices operatively disposed in wireless communication (e.g., IEEE 602.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 602.118 (a, b, g, n, etc.) to provide secure, reliable, fast wireless connectivity. A Wi-Fi network can be used to connect computers to each other, to the Internet, and to wire networks (which use IEEE 602.3-related media and functions).

The various elements of the devices as previously described with reference to FIGS. 1-5 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 7:
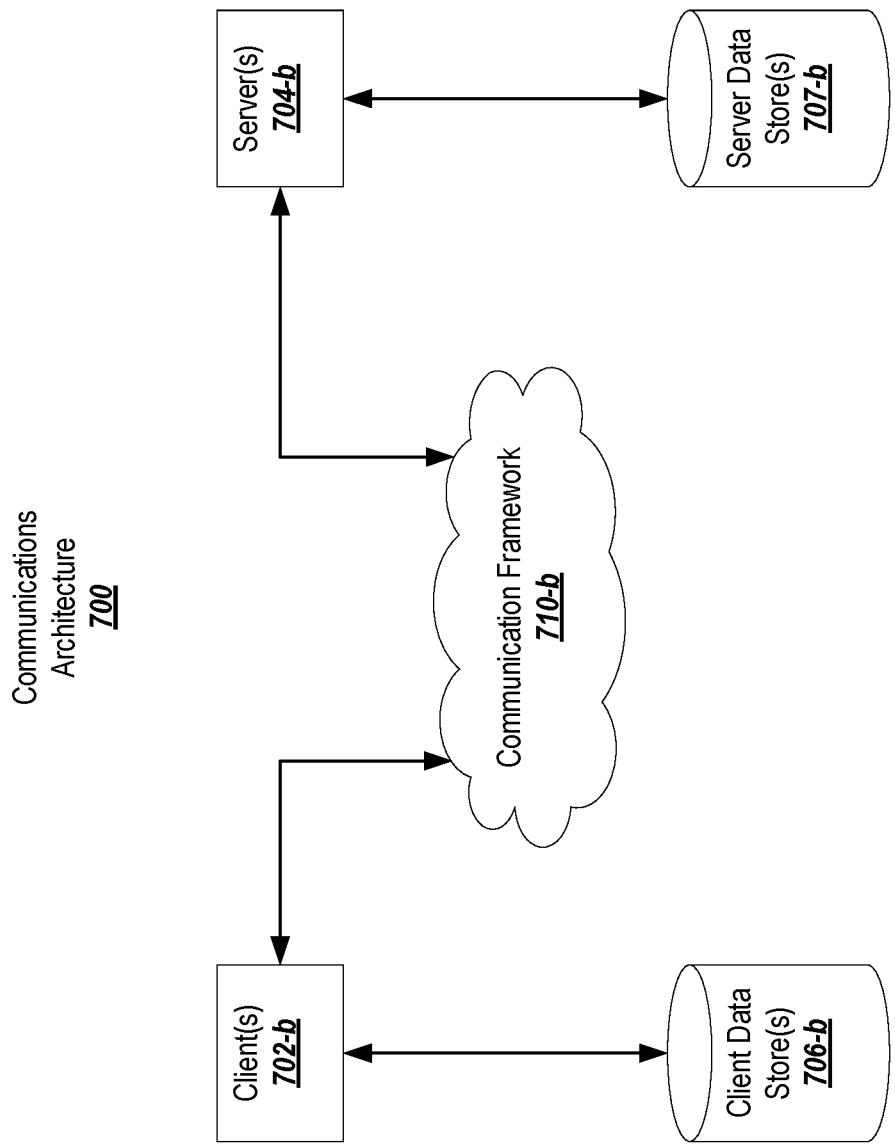
FIG. 7 illustrates an embodiment of a communications architecture useful with at least one embodiment of the present disclosure.

FIG. 7 is a block diagram depicting an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700, which may be consistent with system 100.

As shown in FIG. 7, the communications architecture 700 includes one or more clients 702 and servers 704. The servers 704 may implement the server device 526. The clients 702 and the servers 704 are operatively connected to one or more respective client data stores 706 and server data stores 707 that can be employed to store information local to the respective clients 702 and servers 704, such as cookies and/or associated contextual information.

The clients 702 and the servers 704 may communicate information between each other using a communication framework 710. The communications framework 710 may implement any well-known communications techniques and protocols. The communications framework 710 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 710 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 702.7a-x network interfaces, IEEE 702.16 network interfaces, IEEE 702.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects. What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
a memory to store instructions; and
processing circuitry, coupled with the memory, operable to execute the instructions, that when executed, cause the processing circuitry to:
apply a reduced input machine learning model (MLM) to an applied dataset, the reduced input MLM being derived from an original MLM, the reduced input MLM generated by the original MLM having been:

trained using a first dataset, including generating a plurality of weights for the original MLM;

validated using a second dataset, including validating at least one hyperparameter of the original MLM;

tested by a third dataset, including evaluating i) an accuracy ability, ii) a precision ability, and iii) a recall ability of the original MLM; and pruned such that at least a first input of a plurality of inputs of the original MLM is not included as an input of the reduced input MLM based on a ranking generated by a fourth dataset, wherein each of the first dataset, the second dataset, the third dataset, and the fourth dataset is distinct from one another, wherein the ranking is based on a multimodal gaussian distribution that includes three or more peaks, wherein the multimodal gaussian distribution is generated based on a variant analysis during a backpropagation operation of each input of the original MLM;

compare a size of the reduced input MLM and a memory capacity of a target device to determine that the size of the reduced MLM is greater than the memory capacity of the target device; and based on the determination that the size of the reduced input MLM is greater than the memory capacity of the target device, prune the reduced input MLM to remove a second input of the plurality of inputs of the original MLM included in the reduced input MLM to generate a second reduced MLM.

2. The apparatus of claim 1, wherein the variant analysis of the backpropagation operation sums each weight along a path of each input of the original MLM, wherein the first input is removed based on the summed weights of each path, wherein the processing circuitry is further caused to:

determine that a size of the second reduced MLM is below the memory capacity of the target device.

3. The apparatus according to claim 1, the processing circuitry being further caused to:

train the reduced input MLM using a fifth dataset;

after training the reduced input MLM, validate at least one hyperparameter of the reduced input MLM using a sixth dataset; and after validating the reduced input MLM, testing i) an accuracy ability, ii) a precision ability, and iii) a recall ability of the reduced input MLM using a seventh dataset.

4. The apparatus according to claim 3, wherein each one of the first dataset, the second dataset, the third dataset, the fourth dataset, the fifth dataset, the sixth dataset, and the seventh dataset are distinct from one another.

5. The apparatus of claim 1, wherein the ranking associated with the original MLM is an automatically generated ranking based on the variant analysis during the backpropagation operation that sums each weight along a respective path of a plurality of paths of each input of the original MLM.

6. The apparatus of claim 5, wherein the pruning of the plurality of inputs of the original MLM is based on one of the three or more peaks and one or more thresholds.

7. The apparatus of claim 6, the processing circuitry being further caused to retest the reduced input MLM based on at least the fourth dataset, wherein the retesting eliminates at least one more input of the reduced input MLM, and wherein the at least one more input is associated with another peak of the three or more peaks of the multimodal gaussian distribution.

8. A method, comprising:

receiving a machine learning (ML) dataset;

partitioning the ML dataset into a first dataset, a second dataset, a third dataset, and a fourth dataset;

training, by a computer processor, a machine learning model (MLM) based on the first dataset, wherein the training includes generating a plurality of weights for the MLM;

after training the MLM, validating at least one hyperparameter of the MLM based on the second dataset; after validating the MLM, testing i) an accuracy ability, ii) a precision ability, and iii) a recall ability using the third dataset;

after testing the MLM, automatically ranking an importance associated with each of a plurality of inputs of the MLM using the fourth dataset, wherein the ranking is based on a multimodal gaussian distribution that includes three or more peaks, wherein the multimodal gaussian distribution is generated based on a variant analysis during a backpropagation operation of each input of the original MLM;

reducing the plurality of inputs of the MLM based on the automatic ranking by removing a first input of the plurality of inputs as input to the MLM, wherein each of the first dataset, the second dataset, the third dataset, and the fourth dataset are distinct from one another;

comparing a size of the reduced input MLM and a memory capacity of a target device to determine that the size of the reduced MLM is greater than the memory capacity of the target device; and based on the determination that the size of the reduced input MLM is greater than the memory capacity of the target device, pruning the reduced input MLM to remove a second input of the plurality of inputs of the original MLM included in the reduced input MLM to generate a second reduced MLM.

9. The method of claim 8, wherein the automatically ranking the importance associated with each input of the MLM comprises: performing the variant analysis on each input of the MLM to determine the importance associated with each input of the MLM.

10. The method of claim 9, wherein the reduction of the plurality of inputs is based on one or more results of the variant analysis.

11. The method of claim 10, the method further comprising:

training, by the computer processor, the reduced input MLM using a fifth dataset;

after training the reduced input MLM, validating at least one hyperparameter of the reduced input MLM using a sixth dataset; and after validating the reduced input MLM, testing i) an accuracy ability, ii) a precision ability, and iii) a recall ability of the reduced input MLM using a seventh dataset.

12. The method according to claim 11, wherein each one of the first dataset, the second dataset, the third dataset, the fourth dataset, the fifth dataset, the sixth dataset, and the seventh dataset are distinct from one another.

13. The method according to claim 9, the method further comprising:

prior to reducing the plurality of inputs, generating a normalized importance distribution based on the variant analysis, wherein the reduction of the plurality of inputs is based on one or more thresholds associated with the distribution.

14. The method according to claim 13, wherein generating the normalized importance distribution comprises:

summing, using the variant analysis during the backpropagation operation for each input of the MLM, a value associated with each weight along a path of each input of the MLM; and determining the normalized importance distribution based on the summation.

15. The method according to claim 14, wherein the one or more thresholds are associated with one or more peaks of the multimodal gaussian distribution.

16. The method according to claim 15, wherein at least one input removed from the reduced input MLM is associated with one of the one or more peaks of the multimodal gaussian distribution, and the method further comprises:

retesting the reduced input MLM based on a fifth dataset, the retesting removing at least one additional input of the reduced input MLM, and wherein the additional input is associated with another one of the one or more peaks of the multimodal gaussian distribution.

17. A non-transitory computer-readable storage medium storing computer-readable program code executable by a processor to:

train, by a computer processor, a machine learning model (MLM) using a first dataset, wherein the training includes generating a plurality of weights for the MLM;

validating at least one hyperparameter of the MLM using a second dataset;

testing i) an accuracy ability, ii) a precision ability, and iii) a recall ability using a third dataset;

automatically rank an importance associated with each of a plurality of inputs of the MLM using a fourth dataset, wherein the ranking is based on a multimodal gaussian distribution that includes three or more peaks, wherein the multimodal gaussian distribution is generated based on a variant analysis during a backpropagation operation of each input of the original MLM;

reduce the plurality of inputs of the MLM based on the automatic ranking by removing a first input of the plurality of inputs as input to the MLM; after reducing the plurality of inputs of the MLM, retest the reduced input MLM using a fifth dataset, wherein the retesting includes testing i) an accuracy ability, ii) a precision ability, and iii) a recall ability of the reduced input MLM;

compare a size of the reduced input MLM and a memory capacity of a target device to determine that the size of the reduced MLM is greater than the memory capacity of the target device; and based on the determination that the size of the reduced input MLM is greater than the memory capacity of the target device, prune the reduced input MLM to remove a second input of the plurality of inputs of the original MLM included in the reduced input MLM to generate a second reduced MLM.

18. The non-transitory computer-readable storage medium of claim 17, wherein the automatic ranking is based on an importance associated with each input of the MLM derived from performing the variant analysis during the backpropagation on each input of the MLM, and wherein the reduction of the plurality of inputs is based on one or more results of the variant analysis.

19. The non-transitory computer-readable storage medium of claim 18, wherein the first dataset, the second dataset, the third dataset, the fourth dataset, and the fifth dataset are distinct from one another.

20. The non-transitory computer-readable storage medium of claim 19, further comprising computer-readable program code executable to cause generation of a graphical distribution of the ranking based on the variant analysis, and wherein the reducing of the plurality of inputs is based on thresholds associated with the graphical distribution.

* * * * *